United States Patent [19]
Noel

[11] 3,752,341
[45] Aug. 14, 1973

[54] SEMI-AUTOMATIC LOADER FOR CONTINUOUS MUFFIN GRIDDLES

[76] Inventor: Eugene M. Noel, 42 Kingston Rd., Newton Highlands, Mass. 02161

[22] Filed: Sept. 17, 1971

[21] Appl. No.: 181,513

[52] U.S. Cl..................... 214/314, 214/91, 214/152, 214/302
[51] Int. Cl............................................. B65g 47/04
[58] Field of Search...................... 214/91, 301, 302, 214/314, 152

[56] References Cited
UNITED STATES PATENTS
2,311,709  2/1943  Taylor................................ 214/301
3,109,531  11/1963  Jackson ............................. 214/314

*Primary Examiner*—Gerald M. Forlenza
*Assistant Examiner*—Lawrence J. Oresky
*Attorney*—Charles W. Rummler et al.

[57] ABSTRACT

A semi-automatic dough piece feeding process, and apparatus capable of being used in practicing the process, for the loading of continuous griddles of the conveyor type, comprising the steps of placing dough pieces on a tray having a plurality of positioned cups, placing a multiplicity of trays in a drawer on a mobile rack conveniently located aside the infeed end of the continuous griddle, removing a tray from the drawer and engaging it in a locating assembly mounted to the infeed end of the continuous griddle, up-ending the tray thus engaged to deposit the dough pieces thereon into receiving cups positioned on an auto-turn assembly mounted to the infeed end of the continuous griddle, dumping of the dough pieces from the receiver cups into positioned griddle cups on the moving conveyor flight, and returning the empty tray to starting position and removal therefrom ready for a repeat cycle.

10 Claims, 7 Drawing Figures

Patented Aug. 14, 1973
3,752,341
2 Sheets-Sheet 1
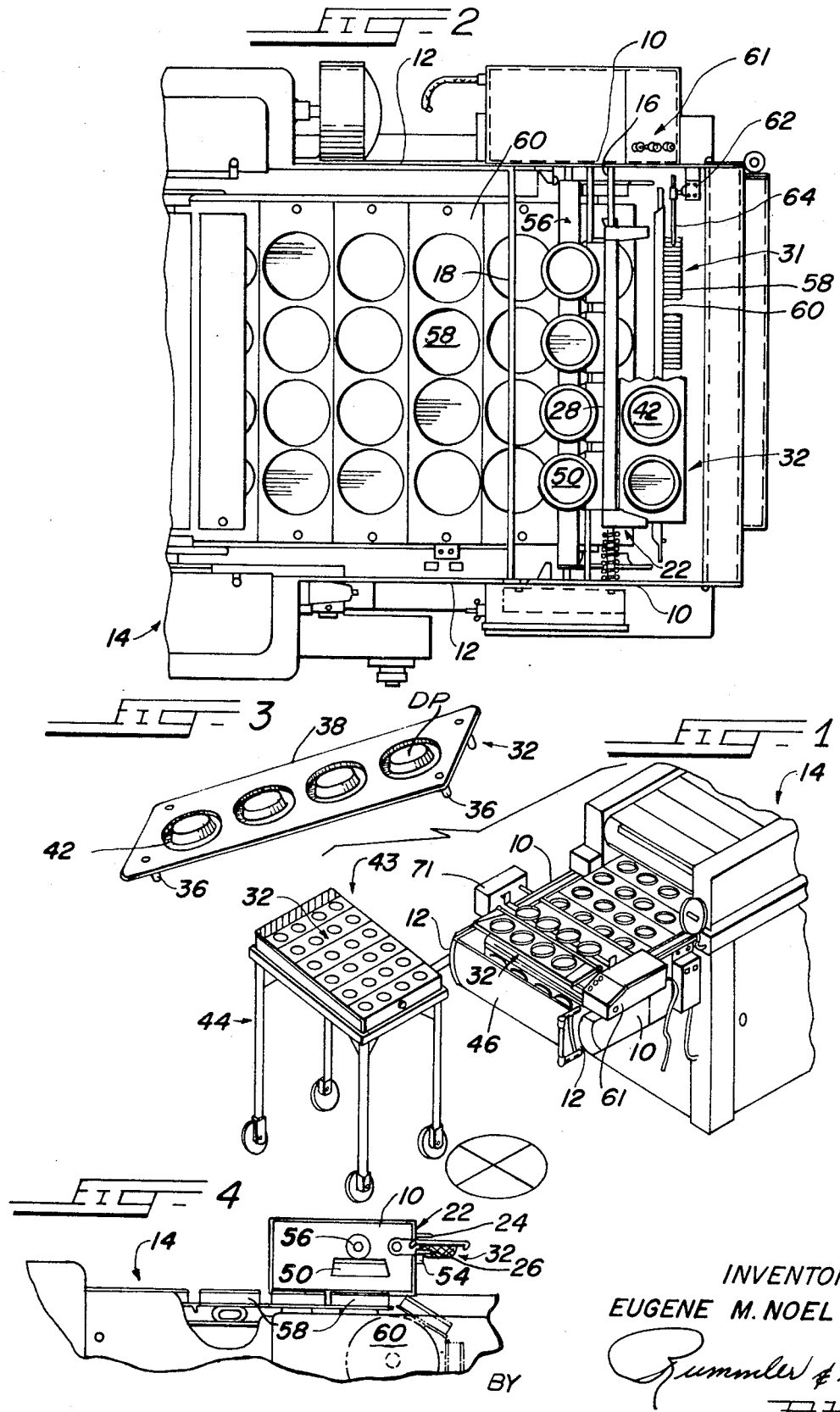
INVENTOR.
EUGENE M. NOEL

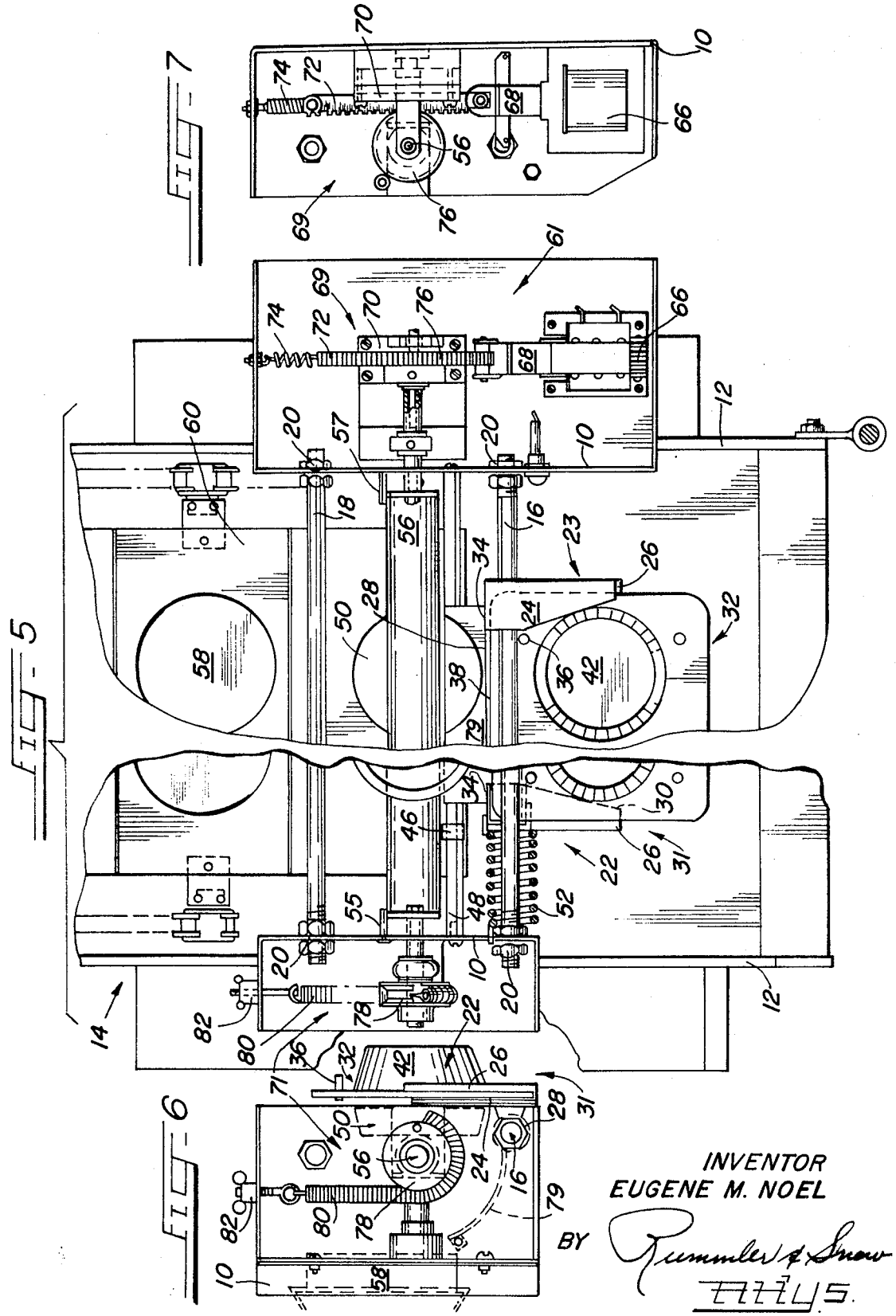

ND_PATENT_NO_3752341

SEMI-AUTOMATIC LOADER FOR CONTINUOUS MUFFIN GRIDDLES

BACKGROUND OF THE INVENTION

This invention concerns an apparatus for attachment to a conveyor-type griddle, for the industrial grilling, cooking or baking of English muffins and the like, providing for manual loading of the continuous griddle on a semi-automatic basis.

The design of continuously operating industrial process machinery ultimately involves the problem of co-ordinating the manual infeed of the product to be processed with the input requirements of the following continuously operating process machine. Applicable materials handling techniques adaptable for specific industry applications depend in the main on the physical characteristics of the material handled. Only in unique cases can fully automatic loading of continuously operating processing machinery be made directly from a hopper or storage bin without the aid or help of human hands. More often than not the characteristics of the product material are such that it does not lend itself to such fully automatic materials handling methods and systems incorporating semi-automatic handling techniques involving some manual work have been devised. Such is the case in the handling of wet tacky proofed dough pieces used in the grilling of English muffins.

In the industrial production of grilled English muffins, it has been customary for operators to take divided dough pieces and manually load moving form cups on a continuous griddle as disclosed in my U.S. Pat. No. Re. 24,855. Dough piece handling rate for this apparatus is directly limited by the number of operators who can be stationed in the limited access space for hand loading of the griddle cups on an individual basis. Each hand-loader in the performance of his work is faced with recurrent time-consuming multiple movement time and space options necessary for coordinating the picking up and placement of each dough piece in this respective cup at that particular time. This severely limits the productive capacity of such apparatus.

In order to maximize productive capacity of a continuous griddle of the kind disclosed in Re. U.S. Pat. No. 24,855, it is necessary to load dough pieces in the plurality on trays in the multiple and store the assembly in the aggregate to give the operator the leverage needed to keep the continuous griddle in uninterrupted production. Only by relieving the operator of the duty of piece-loading can the full productive capacity of such continuous griddles be realized.

The instant invention, called auto-turn, provides an electro-mechanical means for so relieving the operator of this burdensome duty and accomplishes this purpose allowing a continuous griddle to operate at its maximum productivity.

SUMMARY OF THE INVENTION

This invention provides a process and an apparatus for the carrying out of the process which allows for the piece-loading and multiple storage of trays having a plurality of cups holding proofed dough pieces placed therein in preparation for a production run at maximum productivity of a continuous griddle such as disclosed in my U.S. Pat. No. Re. 24,855. These trays, each with its plurality of dough pieces, are laid side-by-side in drawers positioned on mobile racks placed proximate to the infeed of the apparatus of this invention allowing the operator accessibility to all trays at all times within arm's reach. Drawer replacements are readily available on mobile racks nearby as successive drawers are exhausted of a full complement of trays during the production run.

At the start of the semi-automatic loading cycle, a tray holding the dough pieces is held horizontally by the operator and engaged in a locating yoke assembly pivotally mounted to the infeed end of the continuous griddle. Each tray has four pins projecting from the bottom. As the tray is engaged in the locating yokes, the pins contact laterally spaced beveled yoke edges and laterally guide the tray to its starting position. In the insertion of the tray flange between spaced coplanar top and bottom arms of the yoke up against a forward stop on the yoke assembly, the tray and its dough pieces are positioned horizontally and vertically with regard to the positioning requirements of the infeed end of the continuous griddle in readiness for starting the automatic loading of the dough pieces to the continuous griddle.

Pivotally up-ending the tray in a forward movement from the starting position deposits the dough pieces into the receiving cups aligned and positioned in readiness for their automatic dumping therefrom into the griddle cups moving on the conveyor flight below. Without releasing the tray after the deposition of dough pieces, the operator returns it empty to the starting position. He then removes the tray from the locating yoke assembly, making it available for the insertion of a new tray with a new load of dough pieces. A spring return insures the return of the tray to starting position in the event the operator fails to do so manually.

The dough pieces as deposited in the receiving cups are orientated therein dry side down against the bottom of the cup. This configuration is desirable from the standpoint of the need for quick dump of the dough from receiver cup to griddle cup when the receiver cup is up-ended. Wet, tacky dough sticks to the cup and renders timing of the dump of the dough uncertain and difficult. Dry dough dumps to the griddle cup below quickly at a predictable time.

Coordination of the timing of dump of the receiver cups into the moving griddle cups is accomplished by an electro-mechanical device combining the action of a normally energized solenoid for holding the receiving cups in receiving position in combination with a rack and pinion and tension spring device for timely up-ending the receiving cups when the griddle cups are situated below. De-energizing the solenoid at the proper time releases its connected rack against the pull of the tension spring acting to turn a pinion gear mounted on the end of a shaft carrying the up-ended receiver cups mounted thereon. A normally closed limit switch mounted to a side frame member opens an electrical circuit when actuated by a trip rod and de-energizes the solenoid at the proper time sensing the presence of a griddle cup situated on the moving conveyor. The signal is given to command the pinion to dump the dough piece at the right time to a griddle cup below. Once the trip rod loses contact with the moving griddle cup, the limit switch returns to its normally closed position and the electrical circuit is closed, re-energizing the solenoid. The plunger of the re-energized solenoid pulls on the rack, and the racks pulls on the tension spring while the pinion gear mounted on the end of the shaft engaging the rack reverses in rotation and returns the receiver cups to starting position ready for the next loading cycle. Stops are provided to limit the forward turn of the shaft carrying the receiving cups in the dump operation and the back-ward turn upon their return.

DESCRIPTION OF THE DRAWINGS

In order to demonstrate the invention, reference is made to the non-limiting embodiment illustrated by the drawings, in which:

FIG. 1 is a perspective view of the semi-automatic muffin loading apparatus mounted on the infeed end of a continuous griddle with the drawer containing the multiple trays loaded with a plurality of dough pieces laid on a mobile rack positioned nearby.

FIG. 2 is a plan view of the same apparatus mounted on the infeed end of a continuous griddle showing the trip rod and limit switch for coordinating receiver cup dump with griddle cup position.

FIG. 3 is a perspective view of the tray loaded with a plurality of dough pieces positioned in the spaced cups thereon showing the locating pins projecting from the bottom side of the flange.

FIG. 4 is a fragmentary left side view of the apparatus showing the tray engaged in the locating yokes in starting position with the receiver cups up-ended in coordination with the griddle cup moving on the conveyor chain below.

FIG. 5 is a plan view of the apparatus showing in detail the tray engagement means, the adjacent receiving means and the electro-mechanical coordinating means for dumping the dough pieces into the griddle cups on the moving conveyor below, the right hand fragmentation showing the up-ended position of the dough receiving cup and the left hand fragmentation showing the dough receiving position of the cup, but with the top arm of tray locating yoke removed.

FIG. 6 is a fragmentary left side view of the apparatus of FIG. 5 showing the up-ended tray with the receiver cups for the deposit of dough pieces below and the tension spring and sheave device for the dump operation.

FIG. 7 is a fragmentary right side view of the apparatus of FIG. 5 showing the solenoid and plunger connected to the rack with its engaged pinion gear, and the tension spring connected to the rack for the dump operation.

THE PREFERRED EMBODIMENT

Referring to the drawings, particularly FIG. 1, the semi-automatic muffin feeding apparatus for attachment to a continuous muffin griddle comprises spaced side frame members 10 adapted to be mounted to the infeed end of the frame 12 of a continuous muffin griddle 14. Spaced side frame members 10 are structurally tied together by threaded tie rods 16 and 18 capped with nut and jambnut combination 20 shown in FIG. 5. Tray engaging assembly 31 having tray 32 installed thereon is mounted to the infeed end of the continuous griddle 14.

Tray 32 has a plurality of cups 42 linearly spaced thereon, as shown in FIG. 3, for holding the dough pieces in position to match the infeed position of the griddle cups 58 on the continuous griddle 14. For purposes of high productivity, it is convenient to assemble a multiplicity of such trays 32 in a single drawer 43 and to lay the assembly atop a mobile rack 44. Rack 44 is then positioned close-by the infeed guard 46 of the continuous griddle 14, proximate point "X," as shown in FIG. 1, conveniently within arm's reach of both the trays 32 on rack 44 and the tray locating yoke assembly 22 on the infeed end of the continuous griddle 14 shown in FIG. 2.

Tie rod 16 mounted on frame members 10 pivotally supports tray locating yokes 22, as shown in FIG. 5. Tray locating yokes 22 with the tray 32 in starting position thereon, as shown in FIG. 2, are part of tray engaging assembly 31. Yoke 22 is comprised of a top arm 24 spaced above, coplanar and having a common base of attachment with a bottom arm 26 below, as shown in FIG. 6. Yoke 22 is mounted on bar member 28 which is journaled to tie rod 16, as shown in FIGS. 2 and 5.

In the starting position as shown in FIG. 2, the flange of tray 32 is inserted between top and bottom arms 24 and 26 of yokes 22, shown in FIG. 4, fixing the vertical location of the tray in the tray engaging operation. Spaced bottom arms 26 having laterally disposed beveled inner edges 30, as shown in FIG. 5, fix the sidewise location of utility tray 32 in its insertion, whereas bar member 28 having spaced stops 34 mounted thereon limits the forward insertion of tray 32 therein. Tray 32 has spaced locating pins 36 projecting from four corners of the bottom side of the flange thereof for contacting the beveled edges 30 of spaced bottom arms 26 for the sidewise location of the tray. The flange of tray 32 has a forward edge 38 which contacts the spaced stops 34 mounted to space bottom arms 26 of yokes 22 establishing the forward location of the tray. Tray 32 as engaged in the tray engaging assembly 31 then stands ready for up-ending and the coordinated dumping of dough pieces held therein onto the griddle cups 50 on the moving conveyor flight 60 below.

Tray engaging assembly 31 up-ends cups 42 on tray 32, as shown in FIG. 6, by pivoting the assembly 31 about its forward edge approximately 180° from the starting position shown in FIG. 4 up against stop 46 mounted on support rod 48. Support rod 48 is mounted between side members 10. Up-ending tray cups 42 deposits dough pieces in receiver cups 50 in readiness for the auto-turn operation.

After the dough pieces are deposited in the receiver cups 50, torsion spring 52 shown in FIG. 5, mounted to side frame member 10 in concentricity with tie rod 20 and in connection with bar member 28 of tray engaging assembly 31, automatically returns the empty tray 32 to starting position against return stop 54 which is mounted to frame side walls 10, as shown in FIG. 4. Empty tray 32 is then removed from the tray engaging assembly 31 in preparation for the insertion of a new tray 32 loaded with additional dough pieces.

In the dumping of the dough pieces from the receiver cups 50 to the griddle cups 58, shaft 56 rotates approximately 180° counter-clockwise, as viewed from the right hand side of the griddle 14, up against stop 55 mounted to frame 10, up-ended the receiver cups 50 and, as shown in FIG. 4, dumping the dough pieces to the griddle cups 58 mounted on moving conveyor flight 60 below. The dumping operation can only be made when the up-ended receiver cups 50 are positioned directly above the griddle cups 58 below.

Coordinating means 61 shown in FIG. 2 times the dump of receiver cups 50 with the position of moving griddle cups 58. Coordinating means 61 comprises a normally closed limit switch 62 which is mounted to side frame member 10 and actuated by trip rod 64. Trip rod 64 is positioned adjacent to the path of moving conveyor flight 60 to contact and sense the presence of moving griddle cup 58 mounted thereon and to actuate limit switch 62 thereby. Actuation of limit switch 62 opens an electrical circuit de-energizing solenoid 66 which is mounted to side frame member 10, as shown in FIG. 7. De-energization of solenoid 66 releases the magnetic pull on plunger 68, which is slidable in solenoid 66 in a direction paralleling the movement of conveyor flight 60, allowing plunger 68 to extend from solenoid 66.

Release of contact between passing griddle cup 58 and trip rod 64 deactuates limit switch 62 closing the electrical circuit and energizing solenoid 66 inducing a magnetic pull on plunger 68 to slidably retract into solenoid 66 in the reverse direction. As energized by limit switch 62, magnetic pull on plunger 68 is thus coordinated with the position of griddle cup 58 on moving conveyor flight 60 and is further coordinated with the dough piece dumping operation by the combination action of tension spring and rack and pinion mechanism 69 shown in FIGS. 5 and 7 and tension spring and sheave device 71 shown in FIGS. 5 and 6.

Tension spring and rack and pinion mechanism 69 comprises gibbs 70 mounted to side frame members 10 shown in FIGS. 5 and 7 which slidably support rack gear 72 for movement in a direction paralleling the movement of conveyor flight 60. One end of gear rack 72 is connected to solenoid plunger 68. The other end of gear rack 72 is connected to tension spring 74. Tension spring 74 is further connected to side frame member 10 such that rack 72 pulls tension spring 74 in the direction opposed to the movement of conveyor flight 60.

In rack and pinion mechanism, one end of shaft 56 mounts pinion gear 76, as shown in FIGS. 5 and 7. Pinion gear 76 engages rack 72 so that extension of plunger 68 from solenoid 66 upon actuation of limit switch 62 by trip rod 64 rotates shaft 56 counterclockwise in a direction viewed as before directed up against a stop 57 up-ending receiver cups 59 mounted thereon, as shown in right hand fragmentation of FIG. 5, effecting the dump operation. Product guides 79 shown in FIG. 6 guide the dump of the dough pieces from the up-ended receiver cups 50 into the griddle cups 58 below.

Thus at one end of shaft 56 the extension of plunger 68 from the timely de-energization of solenoid 66 cooperating with tension spring 74 and rack 72 and acting on pinion 76 up-ends the receiver cups 50 in dump. In order to adjust dump timing, the variable tension of the sheave-spring device 71 at the other end of shaft 56 provides an adjustment of the dumping speed so that better coordination of the up-ending of cups 50 with the motion of cups 58 in the dumping operation can be had.

The other end of shaft 56 mounting the sheave-spring device 71 has sheave 78, as shown in FIGS. 6 and 7, carrying tension spring 80 wound clockwise therearound, as viewed from the left side of the griddle 14, with one end fastened in the sheave groove therein. The other end of tension spring 80, pulling forward in a direction paralleling the movement of conveyor flight 60, is connected to side frame member 10 through adjusting hand nut and eye bolt 82, so that the total tension of both tension springs 74 and 80 can be utilized in effecting a dough piece dump operation, or an adjustable tension can be made to provide the necessary coordination adjustment of the apparatus to conform with the continuous griddle conveyor movement and position.

Although several specific embodiments of this invention have been herein shown and described, it will be understood that the details of construction shown may be altered or omitted without departing from the spirit of the invention as defined by the appended claims.

I claim:

1. A process for semi-automatic loading of dough pieces to a continuous griddle having positioned griddle cups moving thereon comprising the steps:
   a. positioning dough pieces on a tray,
   b. engaging the tray in a locating assembly mounted to the continuous griddle,
   c. up-ending the tray engaged therein and depositing the dough pieces into positioned receiving cups below,
   d. up-ending the receiving cups in coordination with the movement of the griddle cups of the continuous griddle and dumping the dough pieces therein into the griddle cups below, and then
   e. removing the tray from the locating assembly in preparation for a repeat cycle therein.

2. An apparatus for the semi-automatic loading of dough pieces in griddle cups positioned above a moving conveyor adjacent the infeed end of a continuous griddle comprising:
   a. a tray means having a plurality of positioned cups thereon for holding dough pieces placed therein,
   b. a tray engagement means mounted adjacent the infeed end of the continuous griddle for locating the tray means when engaged therein and providing for upending of the tray means and the positioned deposit of dough pieces therefrom,
   c. a receiving means for receiving the positioned deposit of the dough pieces from the up-ended tray means,
   d. a dumping means providing for up-ending the receiving means for the positioned dump of the dough pieces therefrom into griddle cups on the moving conveyor, and
   e. a coordinating means for coordinating the up-ending of the receiving means with the positioned griddle cups on the moving conveyor.

3. An apparatus as in claim 2 wherein the tray means comprises:
   a. a flange having top and bottom sides and a forward edge, and
   b. spaced locating pins projecting from the bottom side of the flange for locating the tray on said engagement means.

4. An apparatus as in claim 2 wherein the tray engagement means comprises:
   a. spaced side-frame members mounted to the continuous griddle,
   b. a bar member pivotally mouted to the spaced side-frame members, and
   c. coplanar, spaced yoke means mounted to said bar member for horizontally and vertically locating of the engagement of the tray means therein.

5. An apparatus as in claim 2 wherein the yoke means comprises:
   a. a top arm for vertically locating the top of the tray flange engaged therein,
   b. a coplanar spaced bottom arm for vertically locating the bottom of the tray flange engaged therein having a laterally disposed, beveled inner edge for lateral location of the tray by engagement with the locating pins thereon, and c. a forward stop mounted on the bar member for forward location of the tray engaged therein.

6. An apparatus as in claim 2 wherein the dough piece receiving means comprises:
   a. an auto-turn shaft journaled in the spaced side-frame members, and
   b. receiving cups positioned in coplanar relation thereon.

7. An apparatus as in claim 2 wherein the dough piece dumping means comprises:
   a. a pinion gear mounted to one end of the autoturn shaft,
   b. a rack slidably mounted to the side frame member engaging the pinion and having two ends,
   c. a first tension spring having one end connected to the side frame member and the other end connected to the end of the rack pulling the rack so as to turn the auto-turn shaft in a given direction, and
   d. a stop limiting the turn of the auto-turn shaft in the given direction.

8. An apparatus as defined in claim 7 including:
   a. a sheave having a groove in its circumference mounted to the other end of the auto-turn shaft, and
   b. a second tension spring having one end connected to an adjusting means mounted on the side frame member and the other end wound around and connected to the groove in the sheave pulling the sheave so as to turn the auto-turn shaft in the same given direction.

9. An apparatus as in claim 8 wherein the second tension spring adjusting means comprises:
   a. an eye bolt connected to the end of the second tension spring having a threaded shank extending through a hole in the side-frame member, and
   b. a threaded nut engaging the extension of the threaded shank against the side-frame member.

10. An apparatus as in claim 2 wherein the coordinating means comprises:
   a. a limit switch mounted on the side-frame member and connected in an electrical circuit,
   b. a trip rod operationally connected to the limit switch for opening the circuit when the rod contacts the griddle cup on the moving conveyor,
   c. a solenoid connected in the electrical circuit having a plunger slidably mounted therein connected to the rack so that energization of the solenoid by the limit switch closing the electrical circuit when the griddle cup passes the trip rod pulls the plunger and connecting rack in a given direction in opposition to the pull of the first tension spring turning the autoturn shaft in the direction opposed to the given direction, and
   d. a stop limiting the turn of the auto-turn shaft in the direction opposed to the given direction.

* * * * *